L. BEEGHLEY.
VINE CUTTER.
APPLICATION FILED FEB. 20, 1918.
1,269,042.
Patented June 11, 1918.
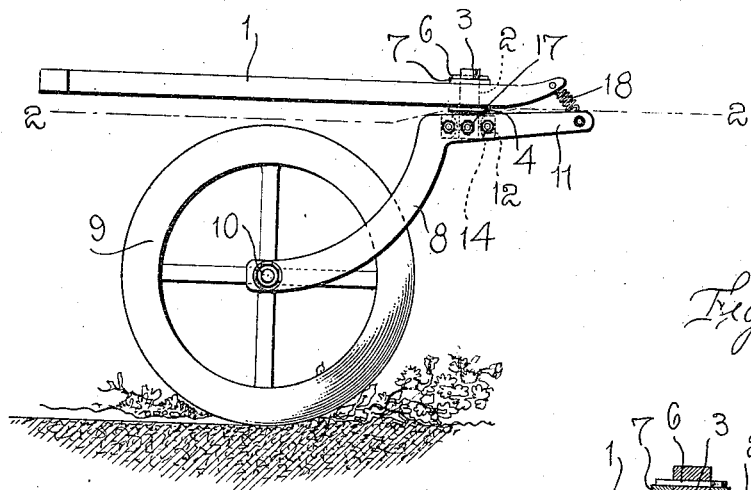
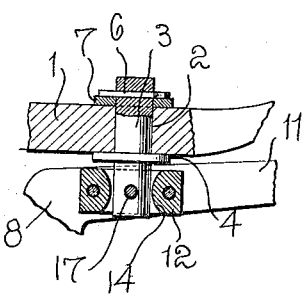
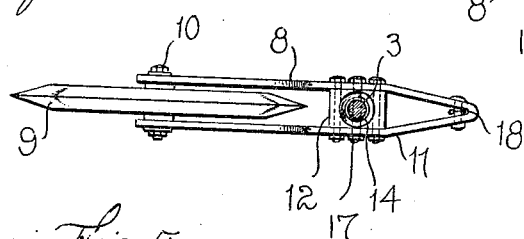
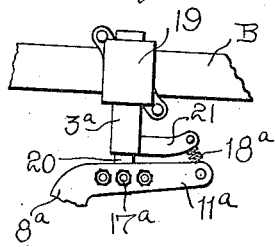
Inventor
LEONARD BEEGHLEY
By Watson E. Coleman
Attorney

UNITED STATES PATENT OFFICE.

LEONARD BEEGHLEY, OF KINGSLEY, IOWA.

VINE-CUTTER.

1,269,042.

Specification of Letters Patent.  Patented June 11, 1918.

Application filed February 20, 1918. Serial No. 218,214.

*To all whom it may concern:*

Be it known that I, LEONARD BEEGHLEY, a citizen of the United States, residing at Kingsley, in the county of Woodbury and State of Iowa, have invented certain new and useful Improvements in Vine-Cutters, of which the following is a specification, reference being had to the accompanying drawings.

This invention relates to certain improvements in vine cutters and it is an object of the invention to provide a novel and improved device of this general character adapted to contact with vines, such as morning glories, lying upon a surface and which is adapted to be used in connection with surface corn plow cultivators or with shovel corn plow cultivators and which is adapted to be suitably coupled to a shank of a cultivator plow.

It is also an object of the invention to provide a novel and improved device of this general character including a rotating cutter or colter together with means for constantly urging said cutter or colter toward the ground.

An additional object of the invention is to provide a novel and improved device of this general character wherein the cutter is carried by a beam and secured to the beam in a manner to permit relative lateral movement of the cutter and its beam during a working operation.

The invention consists in the details of construction and in the combination and arrangement of the several parts of my improved vine cutter whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in side elevation of a vine cutter constructed in accordance with an embodiment of my invention;

Fig. 2 is a sectional view taken substantially on the line 2—2 of Fig. 1;

Fig. 3 is an enlarged fragmentary view partly in elevation and partly in section illustrating in detail the connecting means coacting with the beam and the fork of the cutter as herein included, and Fig. 4 is a fragmentary view in elevation illustrating a modified form of invention.

As disclosed in the accompanying drawings 1 denotes a beam of predetermined dimensions and which is adapted to be suitably secured at its forward end to the shank of a surface or shovel cultivator plow (not shown). The forward end portion of the beam 1 is provided with a vertically disposed opening 2 through which is snugly disposed the upper end portion of a shank 3. The shank 3 substantially mid-way its length is provided with an outstanding annular collar or flange 4, adapted to abut the lower face of the beam 1 to limit the upward movement of the shank 3 when being applied in position. The portion of the shank 3 above the flange or collar 4 is of a length to terminate above the upper face of the beam 1 when in applied position and said upper or extended portion of the shank is provided with the transverse opening 5 through which is adapted to be disposed the cotter pin 6 or the like. Before the cotter pin 6 is applied the washer 7 is placed about the upper or extended portion of the shank 3 and in contact with the top face of the beam 1. The cotter pin 6 coacts directly with the washer 7 whereby the shank 3 is held against downward movement.

8 denotes a fork straddling the circular cutter or colter 9 and said cutter or colter 9 is rotatably supported by the fork 8 through the medium of the removable axle or bolt 10. The fork 8 is arranged on a predetermined downward and rearward incline and the upper end portion thereof terminates in the forwardly directed extension 11. The extension 11 of the fork 8 comprises spaced arms between which is interposed the block 12 held in position therebetween by the bolts 10. The block 12 is provided with a vertically disposed opening 14 through which is directed the lower end portions of the shank 3. The opening 14 is of a diameter in excess of the diameter of the lower end portion of the shank 3 and disposed through the extension 11, the block 12 and the shank 3 is the horizontally disposed bolt 17 whereby the fork 8 is capable of vertical swinging movement so that the cutter or colter supported by the fork may have requisite contact with the ground. Interposed between the free or outer end portion of the extension 11 and the beam 1 is a retractile member 18 herein disclosed as a coil spring and which serves to constantly urge the cutter or colter 9 toward the ground so that the desired cutting of the vines is assured irrespective of any irregularities or unevenness in the surface over which the cutter or colter 9 traverses.

It is also to be noted that the engagement of the shank 3 with the beam 1 is such as to permit rotary movement of the shank 3 so that the fork 8 may have lateral swinging movement relative to the beam 1 to compensate for any lateral movement of the beam 1 during the working operation.

In the form of invention illustrated in Fig. 4, $3^a$ denotes a shank clamped to the beam B of a shovel plow cultivator or the like through the medium of the casing 19. The lower end portion of the shank $3^a$ is reduced as indicated at 20 and said reduced portion is pivotally connected as at $17^a$ with the rearwardly directed extension $11^a$ of the fork $8^a$. The lower portion of the shank $3^a$ immediately adjacent the reduced portion 20 thereof is provided with the lateral extension 21 and interposed between the free end portions of the extensions 21 and $11^a$ is the retractile member $18^a$ serving the same purpose as has hereinbefore been particularly set forth relative to the extension member 18.

From the foregoing description it is thought to be obvious that a vine cutter constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A vine cutter comprising a beam adapted to be secured to the shank of a cultivator plow, a vertically disposed shank having swivel connection with the beam, a fork having pivotal engagement with said shank for movement in a vertical direction, a cutter carried by the lower end portion of the fork, said fork being provided with an extension underlying the beam, and a retractile member connected to the extension of the fork for constantly urging in one direction the cutter carried by the fork.

2. A vine cutter comprising, in combination with a support, a shank engaged with said support, a fork pivotally engaged with the shank, a cutter carried by the lower end portion of the fork, an extension carried by the shank, said fork having an extension underlying the extension of the shank, and a retractile member coacting with the outer extremities of both of said extensions for constantly urging in one direction the cutter carried by the fork.

In testimony whereof I hereunto affix my signature in the presence of two witnesses.

LEONARD BEEGHLEY.

Witnesses:
R. W. PUTTMANN,
F. R. BLEET.

Copies of this patent may be obtained for five cents each, by addressing the "Commissioner of Patents, Washington, D. C."